United States Patent [19]
Miller

[11] Patent Number: 5,331,325
[45] Date of Patent: * Jul. 19, 1994

[54] REMOTE CONTROL TRANSMITTER CONFIGURED AS AN ARTICLE OF UTILITY

[75] Inventor: Howard L. Miller, Chatsworth, Calif.

[73] Assignee: Crimestopper Security Products Inc., Simi Valley, Calif.

[ * ] Notice: The portion of the term of this patent subsequent to Dec. 19, 2007 has been disclaimed.

[21] Appl. No.: 393,500

[22] Filed: Aug. 14, 1989

[51] Int. Cl.⁵ .............................................. G08C 17/00
[52] U.S. Cl. ................................ 341/176; 340/426; 340/539; 340/693; 343/720; 455/95; 455/100; 455/128
[58] Field of Search .................... 341/176, 20; 455/95, 455/128, 100; 340/539, 693, 426; 343/720

[56] References Cited

U.S. PATENT DOCUMENTS

| | | | |
|---|---|---|---|
| 3,134,075 | 5/1964 | Langevin | 455/128 |
| 3,703,714 | 11/1972 | Andrews | 340/426 |
| 3,825,833 | 7/1974 | Bogue et al. | 455/128 |
| 3,902,118 | 8/1975 | Ikrath et al. | 455/100 |
| 4,143,368 | 3/1979 | Route et al. | 340/426 |
| 4,162,449 | 7/1979 | Bouyssounouse et al. | 455/100 |
| 4,535,324 | 8/1985 | Levental | 340/539 |
| 4,725,827 | 2/1988 | Gallegos, Jr. et al. | 341/20 |
| 4,742,336 | 5/1988 | Hall et al. | 340/539 |

Primary Examiner—Glen R. Swann, III
Attorney, Agent, or Firm—Leonard Tachner

[57] ABSTRACT

A key-configured transmitter design has a housing for containing the electronics thereof and a key blank which may optionally be cut to conform to the key shape of the vehicle ignition key or any other key the user might otherwise use on a regular basis. In this manner, it is possible to substitute the transmitter of the present invention for a key that the user would otherwise retain in his pocket or purse, thereby obviating the relative inconvenience of prior art transmitters, which require the addition of a transmitter device to their pocket or purse. The key blank serves the dual purpose of a real key such as for operating the vehicle's ignition and also as an antenna for radiating the oscillator signal produced by the transmitter of the invention.

8 Claims, 4 Drawing Sheets

REMOTE CONTROL TRANSMITTER CONFIGURED AS AN ARTICLE OF UTILITY

BACKGROUND OF THE INVENTION

1. Field of the Invention

The present invention relates generally to hand held remote control devices and specifically to devices that include transmitters that may be operated in connection with security alarms and systems for remotely arming and disarming a controlled security device such as a vehicle alarm.

The invention more specifically involves the use of a highly miniaturized transmitter circuit which may be contained within a housing which forms a part of a key such as an ignition key suitable for operating the vehicle in which the alarm with which the present invention may be used is located. The housing, which is mechanically connected to the key blank, also provides for an electrical connection between the transmitter circuit and the key blank so that the latter acts as an antenna for the former.

2. Prior Art

Miniaturized remote control transmitters for car alarms and other security devices are well known in the art. Typically, such devices require the use of an externally positioned antenna in order to transmit adequate power at the selected frequency of operation to permit arming and disarming of the alarm or other security system from a reasonable distance. The prior art has disclosed various techniques for implementing such an antenna, including by way of example, the use of the human body grasping the remote control transmitter as an antenna. Other examples include using the metal case of the transmitter as the antenna or providing a separate distinct antenna which may be positioned by the user such as in the form of a loop around the user's neck. More specifically, the following issued U.S. patents illustrate the known state of the art relevant to the present invention:

U.S. Pat. No. 4,725,827 to Gallegos, Jr. et al, is directed to a hand held remote control device applicable for use with security alarms. The transmitter includes a circuit board on which there is formed an open loop antenna which is coupled to a key ring, which is shown having a key suspended therefrom.

U.S. Pat. No. 3,825,833 to Bogue et al, is directed to a personal security device comprising a self-powered transmitter concealed within a device such as a hotel key. The transmitter is disposed within the key tag having a chain link for coupling to a key. However, the antenna overlays the transmitter and is not coupled to the key.

U.S. Pat. No. 4,742,336 to Hall et al, is directed to a portable intrusion detection warning system housed in a briefcase configured housing. The system includes a key which is insertable within the momentary key switch. However, the momentary key switch defines a means for disarming the electronic controller, as opposed to providing an antenna coupling to the key.

U.S. Pat. No. 3,902,118 to Ikrath et al, is directed to a body-coupled portable transmitter. The transmitter includes an external coil intended to encompass a portion of the body and couple RF energy thereto. In this way, the body becomes the antenna for radiating the transmitted signal.

U.S. Pat. No. 4,162,449 to Bouyssounouse et al, is directed to a communications system including a portable transceiver alarm unit. The portable alarm unit includes an antenna which is looped around the neck of the individual, thereby coupling to the user's body.

U.S. Pat. No. 3,134,075 to Langevin, is directed to hand-held microphone transmitter. The transmitter is housed within a metal case and includes a quarter wave antenna. The transmitter tank circuit is coupled to the metal case through a capacitor such that the user's body becomes a ground plane when the metal case is grasped, thereby making the system a better radiator.

Unfortunately, all of the remote control security system transmitting devices known to the applicant incur a certain degree of inconvenience on the part of the user. More specifically, in each such case, the user is required to carry something extra, namely, the transmitter device. Even in those cases of the prior art wherein the transmitter is implemented in a sufficiently small package to be added to a keychain or the like, some additional bulk is still required to be carried in a user's pocket or purse. Thus, in addition to the usual contents of a user's pocket or purse, consisting for example of coins, comb, lighter, wallet and, of course, keys; the additional burden and inconvenience of a remote control transmitter housing is also required in order to operate remote control security systems of the prior art.

There has therefore been a long felt need for a remote control transmitter device of the type that may be used for arming and disarming car alarms which overcomes the aforementioned principal deficiency of the prior art by providing a means for housing a remote control car alarm transmitter device in a package configuration which does not add to the bulk of materials carried in the pocket or purse of the user.

SUMMARY OF THE INVENTION

The present invention solves the aforementioned long felt need by providing a car alarm remote control transmitter in a key shaped configuration, the key blank of which may be cut in the same manner as the vehicle's ignition key or for that matter any key which the user might otherwise require. In this manner, the transmitter device of the present invention may effectively be substituted for a key which the user might otherwise be required to carry, thereby obviating any requirement for adding any substantial bulk to the user's pocket or purse in the form of an additional transmitter device which would otherwise not be substituted for the existing contents of the user's pocket or purse. Thus for example, it is contemplated that by using the present invention, one can readily remove a key from a keyring or pocket or the like and substitute the key-configured transmitter of the present invention therefor. The same key function of the removed key is retained while adding a remote control transmitter function, but without substantially increasing the bulk of the key and thus without requiring any substantial addition to the pocket or purse of the user.

There is an additional benefit of the present invention, namely, a reduction in the likelihood of the remote control transmitter devices being lost or stolen because the present invention looks more like a key than like a transmitter and because it will be likely treated with the same level of care and security one treats his vehicle ignition keys or other keys as opposed to a separate object which may be too large or too bulky to retain with one's keys.

The key configuration of the remote control transmitter of the present invention utilizes a housing which forms the grasped portion of the key. The housing contains a printed circuit board upon which the components of the transmitter are mounted and a plurality of very small batteries for powering the transmitter. The housing provides an externally accessible switch and mechanical means for interfacing the key blank which, as previously indicated, may be cut to provide the identical key unlocking characteristics as for example, a vehicle's ignition key. However, in the present invention, the key blank serves still an additional purpose and that is as the antenna for the transmitter contained within the housing. Accordingly, the key blank of the present invention is also electrically coupled to the circuit board contained within the housing so that the output of the transmitter is electrically connected to the key blank which, of course, is made of metal and thus provides a conductive exposed member of the transmitter for radiating the signal to the receiver located in the security system such as in the vehicle.

OBJECTS OF THE INVENTION

It is therefore a principal object of the present invention to provide a unique car alarm remote control transmitter which overcomes the aforementioned deficiency of the prior art by significantly reducing the net amount of additional bulk that must be carried by a user such as in a pocket or purse.

It is an additional object of the present invention to provide a key-configured car alarm remote control transmitter in which the key blank may be cut to conform to the configuration of a vehicle's ignition key while also acting as the antenna for the transmitter.

It is still an additional object of the present invention to provide a key-configured remote control transmitter for a security system such as for remotely arming and disarming such security systems, wherein the transmitter circuit and power source are entirely contained within the key housing.

It is still an additional object of the present invention to provide a remote control transmitter for a security system wherein the transmitter is in the form of a key in which the metal key blank thereof is the antenna for the transmitter.

BRIEF DESCRIPTION OF THE DRAWINGS

The aforementioned objects and advantages of the present invention, as well as additional objects and advantages thereof will be more fully understood hereinafter as a result of a detailed description of a preferred embodiment when taken in conjunction with the following drawings in which.

DETAILED DESCRIPTION OF A PREFERRED EMBODIMENT

Figure 1:
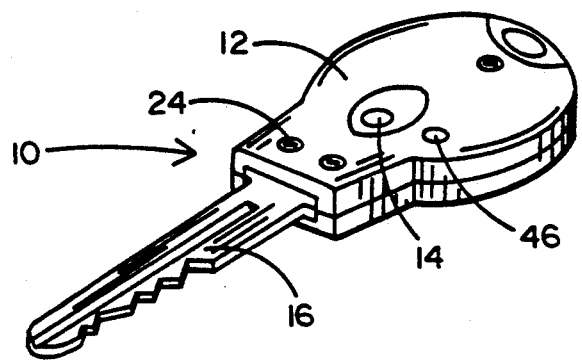
FIG. 1 is an isometric view of the key-configured transmitter of the present invention.
Figure 2:
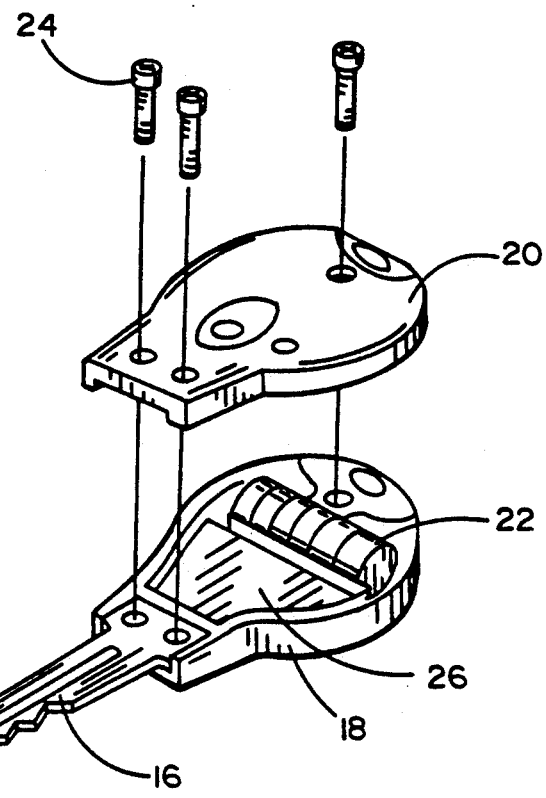
FIG. 2 is an exploded view of the key configured transmitter of the present invention.

Referring first to FIGS. 1 and 2, it will be seen that the remote control key-configured transmitter 10 of the present invention comprises a housing 12 upon which is mounted an activation switch 14 and to which is connected a key blank 16. The housing 12 is implemented in two parts, namely, a receptacle member 18 and a cover member 20. The cover member 20 may be secured to the receptacle member 18 by a plurality of fastening devices such as screws 24.

The receptacle member 18 is provided with the requisite interior volume and shape to receive a plurality of batteries 22 and a printed circuit board 26. Batteries 22, in a preferred embodiment of the invention, are 1½ Volt silver oxide hearing aid batteries, six of which are stacked in serial engagement for providing a 9 volt power source for the transmitter. Except for the batteries 22 and the key blank 16 which acts as an antenna for the transmitter of the present invention, all of the remaining electrical components thereof are attached to the printed circuit board 26 which is preferably located in the receptacle 18 between the batteries 22 and the key blank 16.

Figure 4:
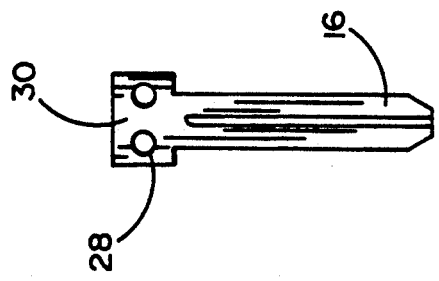
FIG. 4 is a plan view of a typical key blank which may be used in the present invention.
Figure 3:
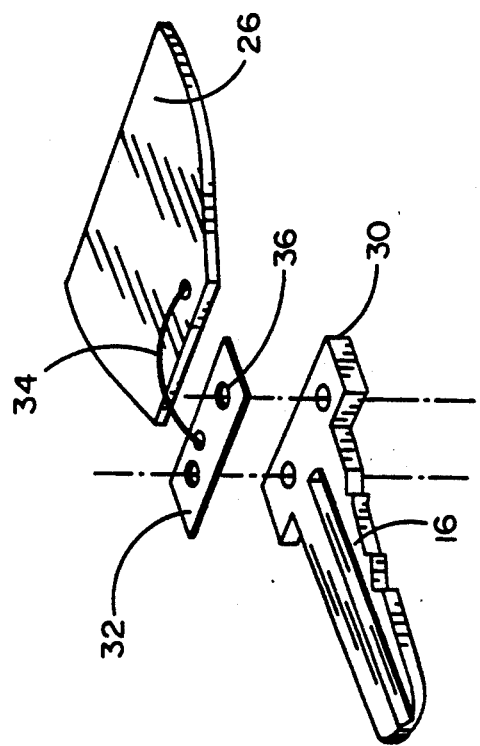
FIG. 3 is an exploded view of a portion of the present invention illustrating the interconnection between the printed circuit board and key blank thereof.

As seen best in FIGS. 3 and 4, key blank 16 may be provided with a rectangular upper or interface portion which is designed to rest within the adjacent portion of the housing 12 and to be mechanically secured thereto by two of the fastening elements 24. Screws 24 are inserted through a pair of key blank apertures 28 for assuring secure engagement between the housing 12 and the key blank 16. As seen in FIG. 3, the circuit board 26 is connected to the key blank 16 by means of a contact plate 32 and a wire 34. Contact plate 32 is preferably of a shape which is relatively congruent to the interface portion 30 of the key blank 16 and is preferably made of a highly conductive material such as copper for a assuring a low resistance interface between the key blank and the remainder of the transmitter circuit. Contact plate 32 is also provided with a pair of coaxially aligned apertures 36 and is thus also secured by the fastening devices 24.

Figure 5:
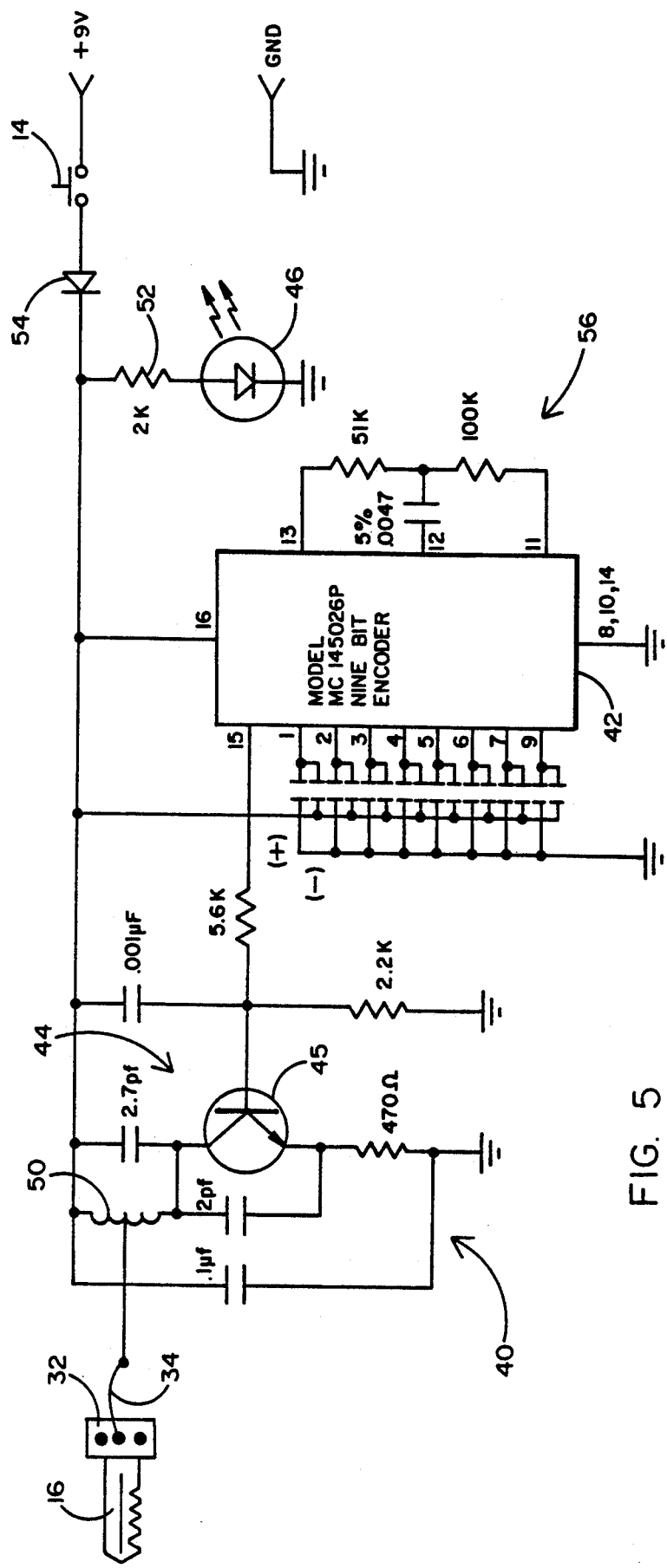
FIG. 5 is a schematic drawing of the transmitter circuit and key blank antenna of the present invention.
Figure 7:
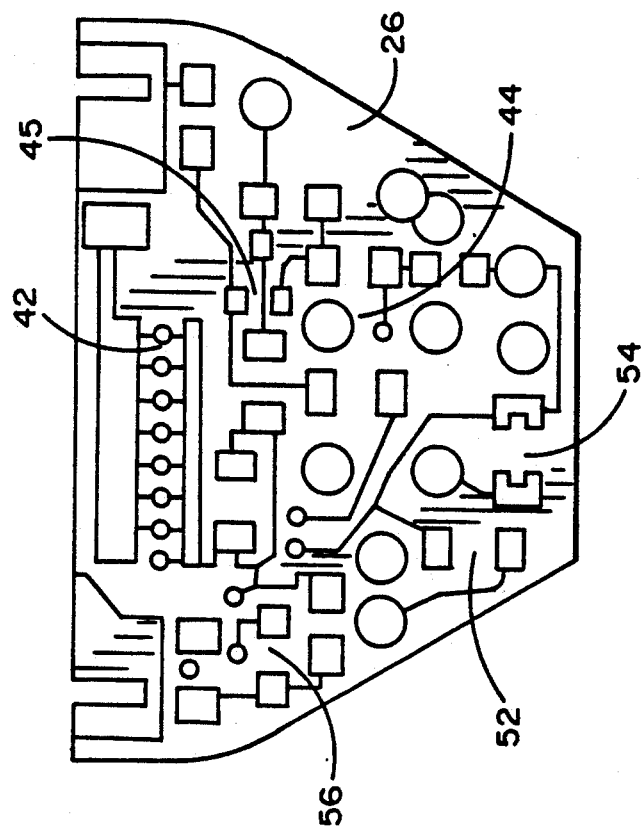
FIGS. 6 and 7 are enlarged views of the front and back sides respectively, of the printed circuit board of the present invention.
Figure 6:
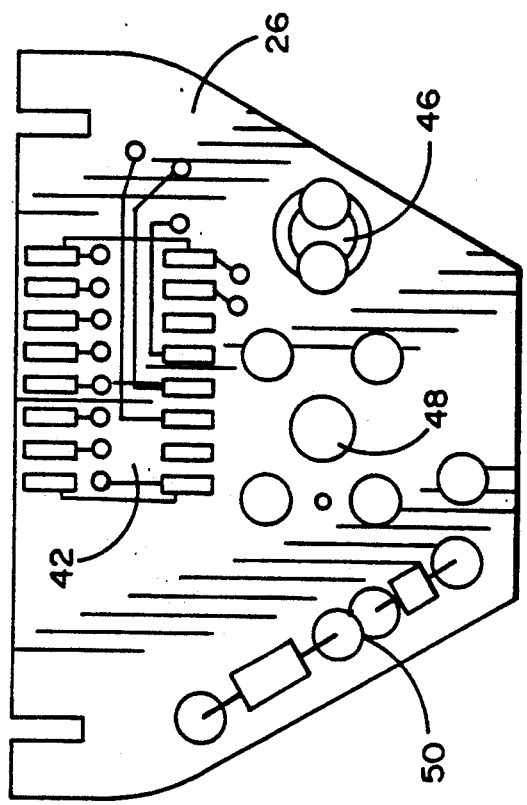

Reference will now be made to FIGS. 5 through 7 for a description of the electrical and physical layouts of the transmitter circuit of the invention. More specifically, it will be seen that in the circuit 40 of FIG. 5, the 9 volt power supply from batteries 22 is applied through actuation switch 14 to the circuit comprising an encoder 42, an oscillator 44 and a light emitting diode 46. The encoder 42 may for example be a 9-bit encoder such as that provided by Motorola Semiconductor under the model number MC145026P. Encoder 42 which serially transmits 9 bits of trinary data as defined by the state of a plurality of input lines. Each transmitted data bit is encoded into 2 data pulses. A logic zero is encoded as two consecutive short pulses. A logic one is encoded as two consecutive long pulses and an open state is encoded as a long pulse followed by a short pulse. The data bit frequency of encoder 42 is determined by the component values of a clock circuit 56. The output of the encoder is applied to the oscillator 44 through a resistor to the base junction of a bipolar transistor 45. Connected across the output of transistor 45 is an LC oscillator network which includes a coil 50. A center tap on coil 50 constitutes the output of the oscillator circuit which is connected by wire 34 to the contact plate 32 and the key blank 16 as previously described.

Included in circuit 40 of the present invention is an LED 46 which is connected through a resistor 52 for providing a visual indication to the user each time the actuator switch 14 has been depressed and contacts a conductive pad 48 for initiating transmission. As seen in FIG. 1, the LED 46 is visible from the outside of the housing 12, immediately adjacent switch 14.

In the preferred embodiment of the present invention depicted in FIG. 5, the oscillator circuit 44 is tuned to operate at a frequency of 313 Mhz. The output of encoder 42 is a positive-going pulse of either short or long duration as previously noted. This positive-going pulse, when applied to the base junction of transistor 45, forward biases that transistor, thereby turning ON the oscillator 44. It follows that when the pulse output of encoder 42 returns to its zero Volts level, the transistor forward biasing is removed and the oscillator circuit turns OFF. Accordingly, the output of the transmitter circuit 40 of the present invention is a series of pulsed radio frequency transmissions of relatively constant amplitude and frequency, the encoded signal being determined by the length and sequence of pulses, the proper combination of which will, of course, be recognized by a comparable decoder in a receiver contained within the security system.

Because the encoder 42 is capable of trinary output states, namely zero, one and open and furthermore because there are nine encoded bits that may be transmitted by the encoder 42, the total number of possible encoder combinations is almost 20,000. The bits of encoder 42 may be programmed by using a plurality of jumpers or conductive paths on the printed circuit board 26 which connect each of the nine input terminals on the left side of encoder 42 as shown in FIG. 5, to either ground potential or a positive potential for zero or one encoding, respectively. The open state encoding may be programmed by simply not connecting the input terminal to either the plus or zero potential which, in fact, is the state of input encoding illustrated in FIG. 5.

The specific physical layout of the printed circuit board 26 and the components of FIG. 5 thereon is shown in FIGS. 6 and 7 respectively, with FIG. 6 showing the front side of the printed circuit board and FIG. 7 showing the backside thereof. The reference numbers shown in FIGS. 6 and 7 correspond to the locations for the components of FIG. 5. The details of the circuit boards shown in FIGS. 6 and 7 comprise the component pads designed to receive the components and are shown herein merely for illustrating one possible board layout which may be employed and has, in fact, been employed in the presently preferred embodiment of the invention. Thus, it will be seen from FIGS. 6 and 7 that it is entirely possible to place all of the components of the transmitter of the type shown in FIG. 5, on a printed circuit board which is sufficiently small to be contained within the housing 12 in a key-configured transmitter for remote control arming and disarming of security systems such as car alarms.

It will now be understood that what has been disclosed herein, comprises a novel portable remote control transmitter primarily adapted for generating the requisite signal for arming and disarming a distant security system controlled by a corresponding receiver such as those found in vehicle alarm systems. A particularly novel feature of the present invention is its configuration. More specifically, the present invention comprises a key-configured transmitter design comprising a housing for containing the electronics thereof and a key blank which may optionally be cut to conform to the key shape of the vehicle ignition key or any other key the user might otherwise use on a regular basis. In this manner, it is possible to substitute the transmitter of the present invention for a key that the user would otherwise retain in his pocket or purse thereby obviating the relative inconvenience of prior art transmitters which require the addition of a transmitter device to their pocket or purse. An additional unique feature of the present invention is the use of the key blank as an antenna for the transmitter of the present invention, whereby the key blank serves the dual purpose of a real key such as for operating the vehicle's ignition and also as an antenna for radiating the oscillator signal produced by the transmitter of the invention.

Those having skill in the art to which the present invention pertains, will now as a result of the applicant's teaching herein, perceive various modifications and additions which may be made to the invention. By way of example, the precise shape and configuration of the mechanical features of the invention as well as the precise electrical design thereof may be readily modified with the benefit of the hindsight derived from the applicant's disclosure. Thus, while the present invention has been shown in a key configuration for obviating the previously noted deficiency of the prior art, it will be understood that a transmitter in accordance with the present invention may be configured in other shapes which may substitute for existing paraphernalia that a user normally carries. Thus for example, it is possible that the transmitter of the present invention might be configured into the form of a case for a lighter where the antenna portion thereof would be a portion of the lighter such as the door portion which may be opened to give access to a wick of the lighter. It will also be clear that the specific component values and operating frequency of the transmitter circuit of the present invention may be readily altered to permit operation with other components at other frequencies. Furthermore, the specific encoder disclosed herein may be substituted by other encoders as well as other modulation means for transmitting a signal to a receiver which will be recognized thereby. Consequently, all of the aforementioned modifications and additions are deemed to be within the scope of the invention which is to be limited only by the claims appended hereto.

I claim:

1. In a transmitter apparatus for remote arming and disarming of vehicle car alarms, the transmitter being of the type having an encoded signal source modulating an oscillator for transmitting an encoded radio frequency signal to a receiver in the vehicle, the improvement comprising:
   a key-shaped housing enclosing said signal source and said oscillator; and
   a key blank mechanically connected to said housing and electrically connected to said oscillator for radiating said radio frequency signal as an antenna.

2. The improvement recited in claim 1 wherein said key blank is cut to permit operation of the ignition of said vehicle.

3. The improvement recited in claim 1 further comprising a contact plate located in said housing in intimate contact with said key blank for assuring a low resistance connection between said oscillator and said key blank.

4. The improvement recited in claim 1 further comprising a switch for applying power to said transmitter and indicating means for indicating when said power is applied to said transmitter.

5. The improvement recited in claim 1 further comprising a serial array of batteries located in said housing for powering said transmitter.

6. A transmitter configured as a functional replication of another object having an enclosed portion and an externally extending metal portion such as a vehicle ignition key; the transmitter comprising:

a radio frequency signal source contained within such enclosed portion of said object and electrically connected to said metal portion of said object;

said metal portion of said object servicing as an antenna for radiating said radio frequency signal;

wherein said object is a key and said metal portion of said object comprises the key blank of said key.

7. The transmitter recited in claim 6 wherein said key is the ignition key for a vehicle.

8. A transmitter configured as a functional replication of another object having an enclosed portion and an externally extending metal portion such as a vehicle ignition key; the transmitter comprising:

a radio frequency signal source contained within said enclosed portion of said object and electrically connected to said metal portion of said object;

said metal portion of said object serving as an antenna for radiating said radio frequency signal;

wherein said signal source comprises an encoder and an oscillator and said radio frequency signal is modulated by said encoder for operation in a remote control security system;

wherein said security system is an alarm for a vehicle and wherein said object is a key for use on said vehicle.

* * * * *